United States Patent [19]

Jay

[11] 3,997,210
[45] Dec. 14, 1976

[54] LIFT CRADLE FOR SHEET MATERIAL

[75] Inventor: Richard Stanley Jay, Evanston, Ill.

[73] Assignee: Jarke Corporation, Chicago, Ill.

[22] Filed: Mar. 15, 1976

[21] Appl. No.: 667,078

[52] U.S. Cl. .............................. 294/81 R; 214/1 S; 294/67 R
[51] Int. Cl.² .......................................... B66C 1/22
[58] Field of Search ................ 294/16, 67 R, 67 A, 294/67 AB, 67 B, 67 BB, 67 BC, 67 D, 67 DB, 63 R, 81 R, 113, 117; 211/41, 50; 214/1 S, 8.5 R, 8.5 SS

[56] References Cited

UNITED STATES PATENTS

| 1,525,146 | 2/1925 | Owen | 294/67 AB |
| 2,314,792 | 3/1943 | Korner | 294/67 AB X |
| 3,887,078 | 6/1975 | Jay | 211/50 |

FOREIGN PATENTS OR APPLICATIONS

| 80,805 | 7/1951 | Czechoslovakia | 294/67 AB |

*Primary Examiner*—Johnny D. Cherry
*Attorney, Agent, or Firm*—Dominik, Knechtel, Godula & Demeur

[57] ABSTRACT

There is disclosed a lift cradle for inserting and withdrawing flat sheet materials from a storage rack formed by a support beam having lift means associated therewith to accommodate interconnection to a lifting mechanism, at least one pair of jaw members mounted on the support beam and extending downwardly therefrom to a lower end, the members of the pair of jaw members being positioned in substantially opposed, and parallel relationship and being spaced apart a distance.

One of the jaw members including cradle means adjacent the lower end thereof and the opposed one of the jaw members including sheet separation means adjacent the lower end thereof, the jaw members being dimensionally sized for insertion within and between the confines of a storage rack of the type formed by a pair of base rails and having a plurality of stanchions mounted thereon for supporting and storing a plurality of flat sheet material, whereby the jaw members may be inserted within the confines of the storage rack to segregate and separate a single sheet of flat sheet material, and trap the same in the cradle means of one jaw member and withdraw the same from the storage rack or alternatively, reverse the process for inserting the flat sheet material within the confines of the rack.

13 Claims, 9 Drawing Figures

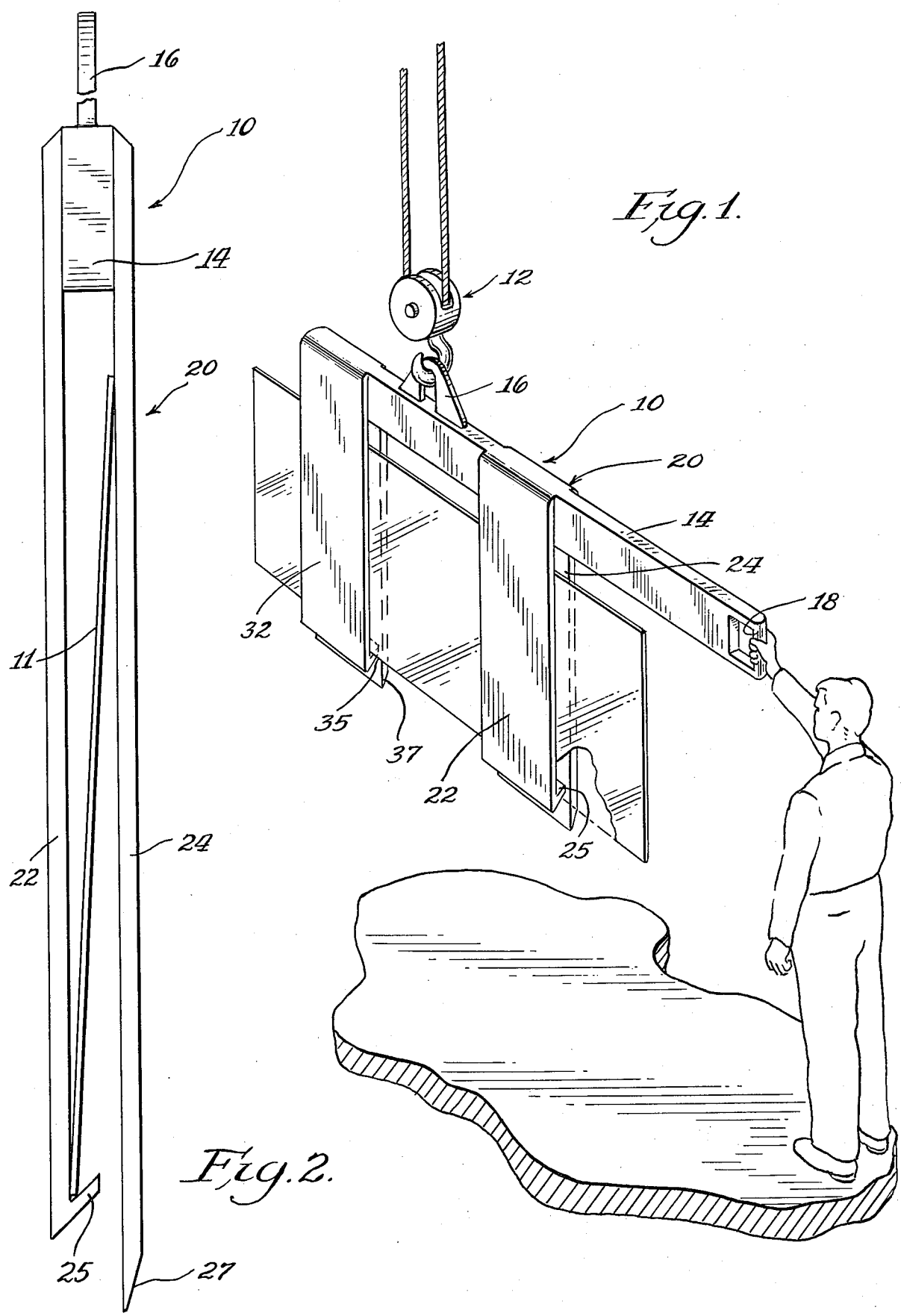

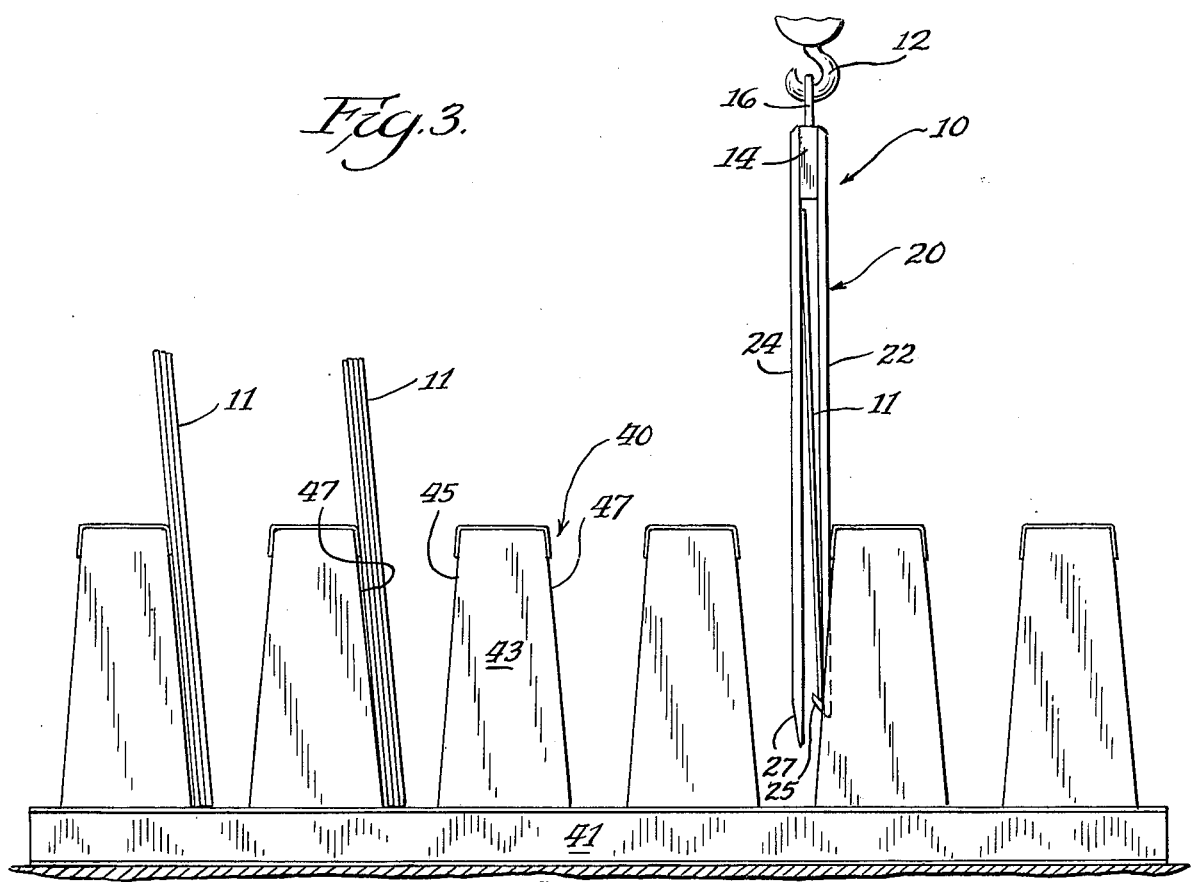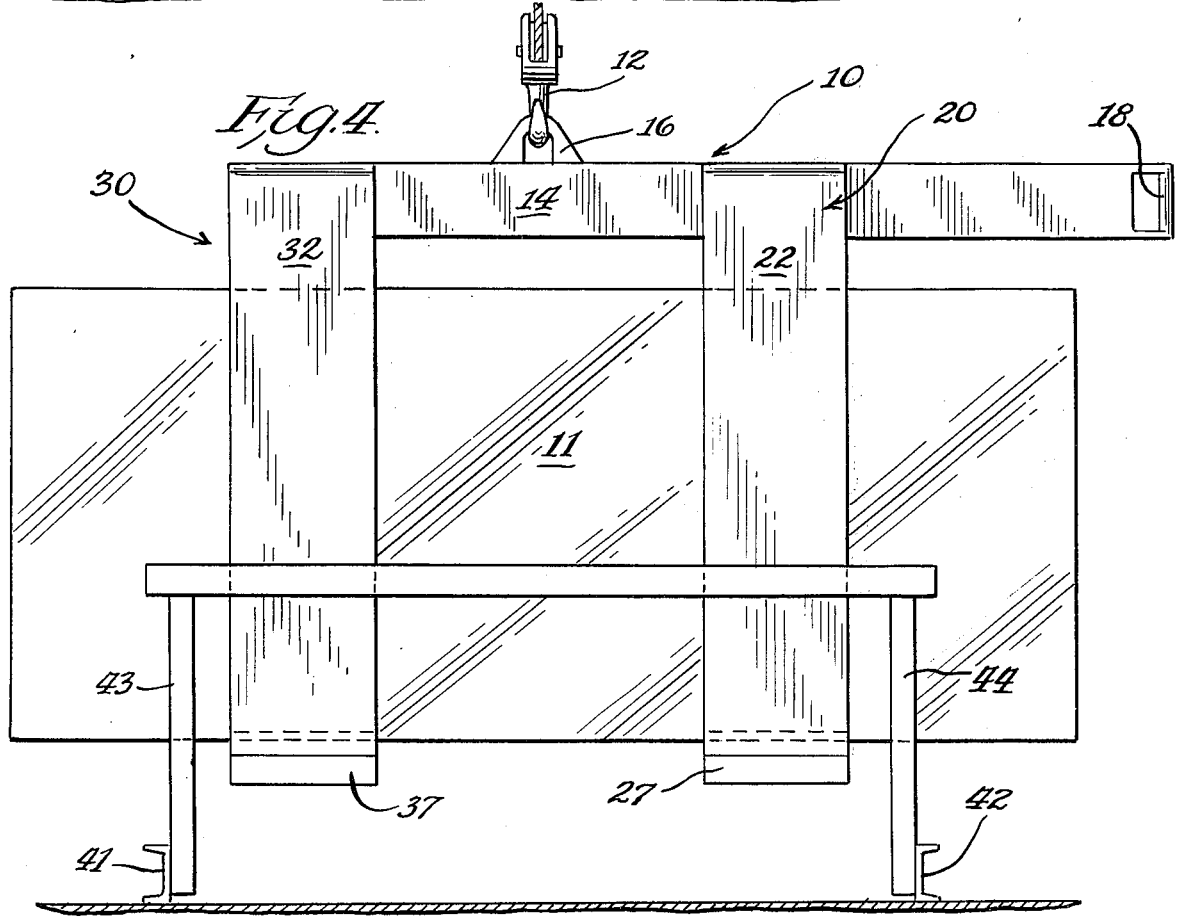

LIFT CRADLE FOR SHEET MATERIAL

BACKGROUND OF THE INVENTION

There are presently available a number of storage racks which serve specialized functions for the storage of various sized and shaped structures. Within this field, there have been several developments involving modularized racks which permit the erection of a storage rack to accommodate a given quantity of materials to be stored for purposes of efficiency and economics in terms of minimizing the amount of lost warehousing space. In this connection, patents such as U.S. Pat. No. 3,887,078 shows a modularized-type storage rack which is employed for the storage of flat sheet materials. Materials of this nature would include wood and fiber-based board products, glass, plaster board, and other such types of materials which are mass produced in large sheets. Hence, while the development of the storage racks has progressed to the point where such racks may be erected on a modularized basis thereby to erect only the number of storage racks necessary for a given quantity of materials, the problem of handling these sheets has remained basically unchanged. In short, the common practice is to simply employ manual labor and to physically store and remove the flat sheets from the subject storage rack. This obviously is not only time consuming, but is economically wasteful.

The problem of storage and handling of such flat sheet materials is quite prominent in the manufacturing operations where such sheets are manufactured. It will be appreciated that in order to keep pace with the automated machinery which manufactures flat sheet materials such as laminates and the like, it is desirable to have transport and handling equipment which can handle the sheets as efficiently as the equipment which manufactures them. The present invention, therefore, is mainly concerned with the problem of the handling and transport of a flat sheet material to and from storage racks of the type indicated hereinabove.

OBJECTS AND ADVANTAGES

The principal object of the invention is to provide a system for handling and transporting flat sheet materials to and from vertical storage racks for storing the same which basically eliminates manual labor insofar as the handling and transport is concerned, while at the same time, rendering such procedure on an efficient basis.

In connection with the foregoing general object, it is yet a further object to the invention to provide a lift cradle for handling and transporting flat sheet materials of the type which includes a support beam having lift means associated therewith for accommodating the interconnection thereof to a lifting mechanism, at least a pair of jaw members mounted on the support beam and extending downwardly therefrom to a lower end, the members of each of the pair of jaw members being positioned in opposed and parallel relationship one to the other, one of the jaw members including cradle means adjacent the lower end thereof while the opposed one of the pair of jaw members includes sheet separation means adjacent the lower end thereof, and the jaw members being dimensionally sized for insertion within and between the confines of a storage rack constructed for storing such vertical flat sheet materials, whereby the lift cradle may be employed to virtually automatically rest and capture a single sheet of flat sheet material within the cradle means of one of the jaw members and to permit the lift and transport of the same with a minimum amount of manual handling.

In connection with the foregoing object, it is a further object of the invention to provide a lift cradle of the type described wherein the cradle means consists of an angularly upturned flange at the lower end of one of the jaw members thereby to permit the jaw member to be lowered beyond the lower edge of the sheet material to be arrested, and then to permit the maneuvering of the jaw member to a position under the bottom edge of the flat sheet material whereupon the lifting of the lift cradle, the flat sheet of material will be arrested and confined within the angularly upturned cradle to permit the transport of the same.

In connection with the foregoing object, it is yet a further object of the invention to provide a lift cradle of the type described wherein the sheet separation means is formed by the opposed jaw member having the lower end thereof include a chamfered lower edge thereby to form a knife edge and to function as a sheet separation means when lowering the pair of jaw members into the storage rack and thereby separating the sheet to be lifted and transported from the remaining bundle of sheets.

A further object of the invention is to provide a lift cradle of the type described wherein the support beam is provided with two pair of jaw members spaced linearly along the length of the support beam and wherein the two horizontally aligned members of each pair of jaw members include cradle means in linear alignment with each other, and each of the opposed members of each of the pair of jaw members include the chamfered lowered edge such that two pair of jaw members, together, provide the cradle for the flat sheet material, while the chamfered knife edges on the opposed members of each pair provide the sheet separation means.

Further features of the invention pertain to the particular arrangement of the elements and parts whereby the above-outlined and additional operating features thereof are attained.

The invention, both as to its organization and method of operation, together with further objects and advantages thereof, will best be understood by reference to the following specification, taken in connection with the accompanying drawings.

BRIEF DESCRIPTION OF DRAWINGS

FIG. 1 is a perspective view showing the subject lift cradle in operation carrying flat sheet materials;

FIG. 2 is a side elevational view showing the manner in which the flat sheet material is carried by the subject lift cradle and showing the basic details of construction forming the lift cradle;

FIG. 3 is a side elevational view showing the lift cradle being employed for lifting flat sheet materials into and out of a vertical storage rack;

FIG. 4 is an end view showing the manner in which the lift cradle cooperates with the vertical storage rack for the flat sheet materials thereby to permit the lift cradle to be inserted within the confine of the storage rack for lifting the sheets into and out of the subject storage rack;

DETAILED DESCRIPTION

Figure 5:
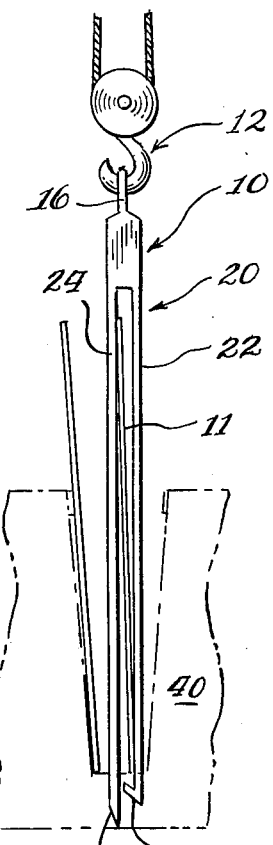
FIG. 5 is one of a sequence of three figures showing the manner in which a sheet of flat sheet material carried by the lift cradle is removed therefrom and positioned within the confines of the storate rack.

As shown in FIGS. 1 and 2 of the drawings, the lift cradle 10 is shown to be supported from a crane lift 12 of the type which are commonly employed in commercial and industrial applications. The structure of the lift cradle 10 is formed by a support beam 14 which has a bail 16 carried thereon and fixedly secured thereto by any suitable means such as weldments or the like. As is shown in FIG. 1, the bail 16 functions as a lift point for permitting the use of a crane lift 12 or such other suitable lifting mechanism as may be employed in any particular application. The support beam 14 is shown to assume a generally horizontal configuration, and further includes a hand grasp portion 18 at its one terminal edge. As further shown in FIG. 1, the operator may grasp the lift cradle 10 by simply grasping the hand grasp portion 18 thereby to guide the lift cradle 10 incident to the lifting and transporting functions associated therewith.

In the embodiment of the lift cradle 10 shown in the figures hererin, the support beam 14 is shown to further include two pairs of jaw members 20 and 30, respectively. Each pair of jaw members 20 and 30 is fixedly secured to the support beam by weldments or such other suitable securement means as are known in the art. The pair of jaw members designated by the numeral 20 is formed by a cradling member 22 and a separation member 24. The cradling member 22 includes a cradling flange 25 at its lower end, the cradling flange 25 being angularly inclined upwardly and extending inwardly from the cradling member 22 for a short distance.

Positioned in opposed and parallel orientation with respect to the cradling member 22 is a separation member 24. It will be observed from FIG. 2 of the drawings that the two members 22 and 24, respectively, are spaced apart for a distance and have a substantially open lower end, with the exception of the interposition of the cradling flange 25 therebetween. The lower end of the separation member 24 is shown to have a chamfered edge 27 which functions in a manner to be more fully described hereinafter. As shown in FIG. 2 of the drawings, a sheet of flat material 11 is supported within the area bounded by the cradling member 22 and separation member 24 respectivley. The flat sheet material 11 is supported by means of the cradling flange 25 at the lower end, and the upper edge of the flat sheet material 11 rests against the inner surface of the separation member 24. As shown in FIG. 1 of the drawings, where elongate flat sheet materials are to be lifted and transported, the preferred embodiment of the invention contemplates the employment of two pair of jaw members 20 and 30, respectively. In all respects, the second pair of jaw members 30 is constructed identically with the pair of jaw members 20, having not only the same structural dimensions, but the same quantitative dimensions. Hence, it will be observed that the second pair of jaw members 30 includes a cradling member 32 and a separation member 34, the lower end of the cradling member 32 including a cradling flange 35, while the lower end of the separation member 34 includes a chamfered edge 37.

It will therefore be appreciated from FIG. 1 of the drawings that to lift and transport an elongate sheet of flat material 11, the provision of two pairs of jaw members 20 and 30, respectively, will function to support both of the ends of the sheet material 11 while the hand grasp portion 18 permits the operator to guide the lift cradle into and out of its lifting and transporting functions.

In FIGS. 3 and 4 of the drawings, the manner in which the lift cradle 10 may be employed in connection with vertical storage rack 40 is illustrated. The vertical storage rack 40 depicted therein is of the type generally shown, described and claimed in the U.S. Pat. Nos. 3,887,078 and 3,912,083 and is shown to include a pair of base members 41 and 42, respectively, (FIG. 4) and having stanchions 43 and 44, respectively, mounted thereon and extending vertically upwardly therefrom. Each stanchion 43 and 44 includes a sheet support surface on each side thereof, generally designated by the numerals 45 and 47, respectively. As shown in FIG. 3 of the drawings, the flat sheets 11 are stored in a compartment of the rack against one of the support surfaces 45 and/or 47.

Where the embodiment of the invention is to be used for elongate flat sheet materials 11, such as shown in FIG. 4 of the drawings, and where a pair of jaw members 20 and 30 respectively are employed, the spacing between the jaw members 20 and 30 respectively is such as to be less than the spacing between the opposed base members 41 and 42. In this manner, the lift cradle 10 may be lowered within the confines of one of the compartments of the storage rack 40 in the manner shown in FIG. 4. Due to this spacing arrangement, as the lift cradle 10 is lowered into the compartment bearing a sheet of flat material 11 therein, the outer edges of the flat sheet material 11 will rest against the base members 41 and 42, respectively, and permit the further lowering of the lift cradle 10. Upon further lowering of the lift cradle 10, it will become apparent that the flat sheet material 11 will become disengaged from the cradling flanges 25 and 35, respectively, thereby to rest on the base rails 41 and 42. The subsequent movement of the lift cradle 10 permits the lift cradle 10 to be removed from the flat sheet material 11 and lifted upwardly thereby to leave the flat sheet 11 within the confines of the storage rack 40 and in the storage posture. The sequence of inserting the flat sheet 11 into the storage rack 40 or removing the same from the storage rack 40 is shown in FIGS. 5 through 7 of the drawings and FIGS. 8 through 9 of the drawings, respectively.

Figure 6:
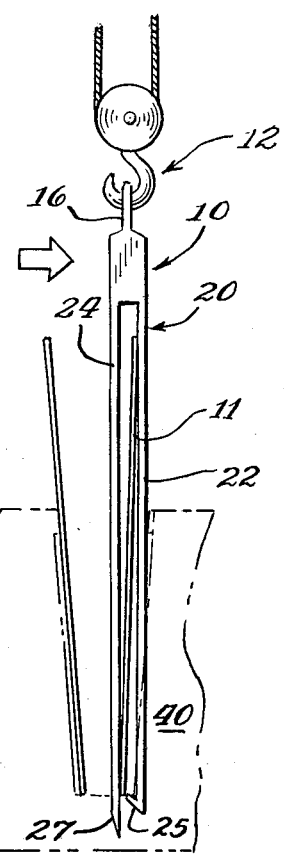
FIG. 6 is the second figure in sequence showing the manner in which the lift cradle is lowered below the lower edge of the sheet material thereby to remove the sheet from the cradle flange and resting the same across the base support of the storage rack.
Figure 7:
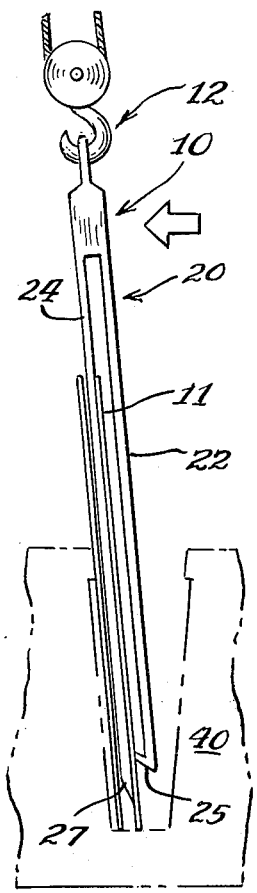
FIG. 7 is the third of the sequence of three figures showing the manner in which the lift cradle is removed from the storage rack leaving the flat sheet material behind and positioning the same on the stack of similar sheet materials within the storage rack.

With respect to the sequence of the storage operation, FIGS. 5, 6, and 7 are relevant with regard to this operation. As shown in FIG. 5, the lift cradle 10 having the flat sheet material 11 cradled and retained therein is lowered by the crane lift 12 within the confines of one of the compartments of the storage rack 40. As the outer edges of the flat sheet material 11 meet and rest against the opposed base members 41 and 42, respectively, and due to the spacing between the pairs of jaw members 20 and 30 being less than the spacing between the base members 41 and 42, respectively, the lift cradle 10 may be further lowered below the lower edge of the flat sheet material 11. As shown in FIG. 6 of the drawings, further lowering of the lift cradle will cause the cradle flanges 25 and 35, respectively, to be lowered below the bottom edge of the flat sheet material 11 while simultaneously, the lift cradle may be moved by the crane lift 12 in the direction of the cradle members 22 and 32, respectively, It will become apparent that by moving the crane lift 12 in the direction of the respective cradle members 22 and 32, respectively, and in view of the fact that the bottom edge of the flat sheet material 11 is now resting on the base members 41 and 42, respectively, the entire lift cradle 10 is moved such that the lower cradle flanges 25 and 35, respectively, are moved beyond the lower edge of the flat sheet material 11. The lift cradle 10 may then be lifted upwardly by the crane lift 12 thereby permitting the flat sheet material 11 to exit through the open space between the opposed cradle members 22 and 32, and separation members 24 and 34, respectively. As the cradle lift 10 is lifted upwardly by the crane lift 12, the lift cradle 10 may then be moved in the direction of the separation members 24 and 34, respectively, as depicted in FIG. 7 of the drawings, thereby to effectively pull the flat sheet material into stacking storage posture with respect to the remaining sheets retained within the confines of the storage rack 40.

Figure 8:
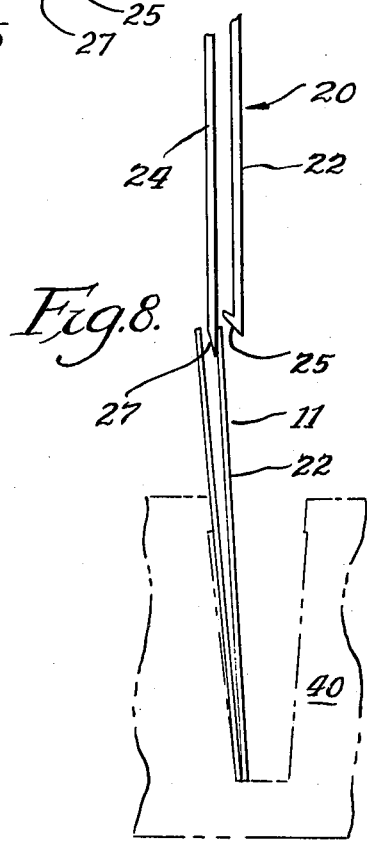
FIG. 8 is the first of a two figure sequence showing the manner in which a single sheet from a stack of similar sheets may be removed from the stack for positioning within the lift cradle.
Figure 9:
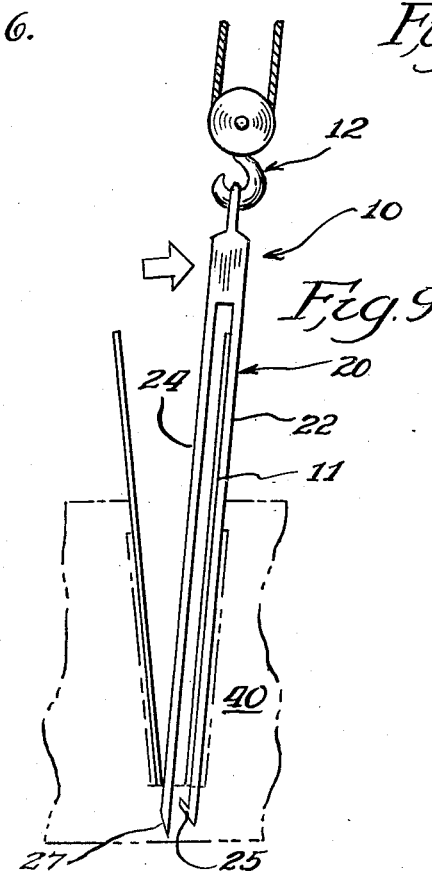
FIG. 9 is the last of the two figure sequence showing the manner in which the lift cradle is lowered below the bottom edge of the flat sheet material until the flat sheet is cradled and rested onto the cradle flange thereby to be supported by the lift cradle and removed from the storage rack.

In FIGS. 8 and 9 of the drawings, the reverse operation is illustrated, that involving the separation of and cradling of a flat sheet of material from an existing stack thereby to remove a single sheet from the storage rack 40. As shown in FIG. 8 of the drawings, the upper edge of the flat sheet of material 11 selected to be removed is pried away from the remaining members of the stack, generally by manual operation. The lift cradle 10 is then lowered into position until the chamfered edges 27 and 37, respectively, of the lift cradle 10 are inserted between the sheet to be lifted and the remaining members of the stack. This is generally shown in FIG. 8 of the drawings. As the lift cradle 10 is then lowered into position, the flat sheet material 11 will enter into the confines of the lift cradle 10 through the open space existing between the opposed cradling members 22 and 32 and the separation members 24 and 34, respectively. The chamfered edges 27 and 37 facilitate the separation of the entire sheet from the existing stack of the sheets within the confines of the storage rack 40.

As the lift cradle 10 is fully lowered into position, the entire confines of the flat sheet material will be positioned within the area formed between the opposed members 22, 32, and 24, 34, respectively. Once the lift cradle 10 has been fully lowered into position such that the lower cradle flanges 25 and 35, respectively, are now positioned below the lower edge of the flat sheet material 11, the crane lift 12 and lift cradle 10 are moved in the direction of the respective cradle members 22 and 32, respectively, until the flat sheet material 11 is located immediately over the respective cradling flanges 25 and 35, respectively. As the lift cradle 10 is then lifted upwardly, the sheet 11 will be confined by the respective cradling flanges 25 and 35 and thereby permit the lifting of the sheet 11 by the lift cradle 10 out of the storage rack 40.

As indicated above, the embodiment of the invention relative to the lift cradle 10 shown herein is formed by two pairs of jaw members 20 and 30. It will be apparent that the requirement for two pair of jaw members 20 and 30 is strictly dependent upon the dimensions of the sheet materials to be lifted and transported. In most applications, it is anticipated that two pair of jaw members would be adequate to support opposed ends of any sheet material. However, it is contemplated that a single pair of legs or jaws may be suitable for sheets, plates, or panels of shortened length or those which are rigid and do not flex. Alternatively, where sheets are substantially elongate, or where sheets are rigid in flexure, the lift cradle 10 may require several pair of jaw members which could be constructed in a dimensionally smaller size to reduce the weight of the overall lift cradle and maintain a degree of maneuverability and flexibility. In this connection, it will be noted from the drawings that the preferred embodiment contemplates that the length dimension of each of the members of each jaw member is slightly in excess of two times the width dimension and once again, the relative dimensions of the members forming each pair of jaw members 20 and 30, respectively, will, to some extent, be dependent on the types of sheet materials in connection with which the lift cradle is to be employed.

It is further contemplated that in some applications, the sheet materials which are to be handled by the lift cradle may require protection against scratching. In this instance, the two opposed members of each pair of jaw members 20 and 30, respectively, may be covered with a plastic or rubber material which may be applied either by dipping, spraying, or adhesive attachment of such protective sheets. Once again, this type of construction is dictated by protection of materials to be handled.

It will further be appreciated that while the specification and drawings herein refer to a crane lift 12 for lifting and maneuvering the lift cradle 10, any form of lifting device may be employed. Hence, the lift may be attached to a fork truck, either by an auxiliary boom, or by equipping the beam of the lift itself for attachment to the forks of the lift truck. Hence, the provision of the bail 16 on the upper edge of the support beam 14 may be modified, again depending upon the lifting equipment available to the end user.

It will further be noted from the above description that although the opposed cradling members and separation members, 22, 32, and 24, 34, respectively, have been defined as being positioned in parallel and spaced relation such that there is an opening between the respective members at the lower end thereof, it is contemplated that this opening may be enclosed by a leg or ledge which is pivotably moveable. As was indicated in the description of the invention, it is necessary that the lift cradle 10 be structurally designed so that the same can be lowered over the sheet of flat material 11 in order to deposit or to lift the sheet 11 from a storage rack 40. Some form of pivotably attached leg or ledge may close the open space between the lower ends of the respective members but be moveable when the sheet 11 bears against the same.

It will be apparent from the above description that the present invention provides an improved lift cradle for lifting and transporting flat sheet materials, including such sheets which are elongate in configuration. The invention as described provides a lift assembly which permits both the insertion as well as the removal of flat sheet materials from storage racks of the type generally available while at the same time minimizing the amount of manual labor associated with the lifting and transporting function. In addition, the lift cradle of the present invention may be employed with any type of lifting mechanism such as a crane lift, fork lift truck, or the like. Hence, the assembly is adaptable to virtually any type pf warehousing operation regardless of the lifting mechanisms involved. It is therefore appreciated that all of the above objects and advantages have been accomplished by means of the lift cradle assembly depicted herein and the various embodiments thereof to provide a compact and economically efficient lifting assembly.

While there has been described what is at present considered to be the preferred embodiments of the invention, it will be understood that various modifications may be made therein and it is intended to cover in the appended claims all such modifications as fall within the true spirit and scope of the invention.

What is claimed is:

1. A lift cradle for flat sheet material for use in conjunction with a storage rack for flat sheet materials of the type formed by at least a pair of base members having a plurality of stanchions mounted thereon in spaced relation along the length of the base members, comprising in combination,
   a support beam having lift means associated therewith to accommodate interconnection to a lifting mechanism,
   at least one pair of jaw members mounted on said support beam and extending downwardly therefrom to lower ends,
   said pair of jaw members being positioned in substantially opposed relation one to the other and being spaced a distance apart,
   one of said jaw members including cradle means adjacent said lower end thereof,
   the opposed one of said jaw members including sheet separation means adjacent said lower end thereof,
   and said jaw members being dimensionally sized for insertion within and between the confines of a storage rack having a pair of base members and a plurality of sheet support stanchions mounted thereon,
   whereby sheet materials stored within the confines of the storage rack may be removed therefrom by lowering said jaw members within the confines of the storage rack such that said sheet separation means segregates an individual sheet material from the remaining sheets stored therein until said cradle means is positioned below the lower edge of the sheet material and said jaw members may then be uplifted thereby to trap and confine the sheet material within the confines of said cradle means to liftingly remove the sheet material from the storage rack and position the same elsewhere, and insertion of the sheet materials within the storage rack may be accomplished by the reverse process.

2. As set forth in claim 1 above, wherein said lift means comprises a bail mounted on said support beam to accommodate the interconnection thereof with any appropriate lifting mechanism.

3. The lift cradle as set forth in claim 1 above, wherein the said pair of jaw members are mounted on said support beam in opposed and parallel orientation one with respect to the other.

4. The lift cradle as set forth in claim 1 above, wherein said cradle means adjacent said lower end of one of said jaw members comprises a flange angularly upturned with respect to said jaw member.

5. The lift cradle as set forth in claim 1 above, wherein said sheet separation means is formed by providing said lower end of said opposed jaw member with a chamfered surface thereby to form a knife edge at said lower end thereof.

6. The lift cradle as set forth in claim 5 above, wherein said chamfered knife edge extends below the lower end of said cradle means on said opposed jaw member.

7. A lift cradle for flat sheet material for use in conjunction with a storage rack for flat sheet materials of the type formed by at least a pair of base members having a plurality of stanchions mounted thereon in spaced relation along the length of the base members, comprising in combination,
   a support beam having lift means associated therewith to accommodate interconnection to a lifting mechanism,
   at least one pair of jaw members mounted on said support beam and extending downwardly therefrom,
   the said pair of jaw members being mounted in opposed and parallel orientation one with respect to the other,
   one of said members of said pair of jaw members terminating at a lower end which includes an angularly upturned cradling flange,
   the opposed one of said pair of jaw members including sheet separation means formed by a chamfered lower end thereof thereby to form a chamfered knife edge at the lower end of said member,
   and said jaw members being dimensionally sized for insertion within and between the confines of a storage rack of the type having a pair of base rails and a plurality of sheet support stanchions mounted thereon,
   whereby sheet materials stored within the confines of the storage rack may be removed therefrom by lowering said pair of jaw members within the confines of a storage rack such that the chamfered knife edge of one member of said pair of jaw members separates and segregates a single sheet of material from the remaining stack of such material and said jaw members are lowered until said cradling flange is positioned below the lower edge of the sheet material, and the jaw members may then be uplifted thereby to trap and confine the single sheet of material within the cradling flange and remove from the storage rack by the continued uplifting of said lift cradle until the sheet material clears the confines of the storage rack for transport to a subsequent location.

8. The lift cradle as set forth in claim 7 above, wherein said jaw members have a length dimension at least twice the width dimension thereof.

9. The lift cradle as set forth in claim 8 above, wherein said support beam includes a lifting bail of the type to accommodate interconnection thereof with any suitable lifting mechanism.

10. The lift cradle as set forth in claim 7 above, wherein the lower ends of the respective jaw members are spaced apart whereby said jaw members are spaced apart along the entire length thereof and have an open lower end to permit insertion and withdrawal of the sheet materials from the confines between said jaw members.

11. The lift cradle as set forth in claim 7 above, wherein said support beam includes two pairs of jaw members, said pairs of jaw members being mounted on said support beam in linearly spaced relation along the length of said support beam, and wherein each of the members of each of said pairs of jaw members are mounted in opposed and spaced relation one with respect to the other.

12. The lift cradle as set forth in claim 11 above, wherein each of said pairs of jaw members includes one jaw member provided with a lower end and having cradle means formed thereon, and the opposed member of said pair of jaw members includes a chamfered knife edge at the lower end thereof, whereby the members of said pairs of jaw members provided with cradle means are mounted on said support beam along one side of said support beam and the opposed members of each of the pairs of jaw members are mounted on the opposed side of said support beam in opposed and parallel orientation with respect to the opposed member of said pair of jaw members.

13. The lift cradle as set forth in claim 1 above, wherein said support beam further includes a hand grasp portion positioned adjacent one of the side edges thereof thereby to facilitate the hand grasping of said lift cradle by the operator thereof in order to guide the same during the lifting and transporting operations.

* * * * *